US012009573B2

(12) United States Patent
Hong et al.

(10) Patent No.: US 12,009,573 B2

(45) Date of Patent: Jun. 11, 2024

(54) ELECTRONIC DEVICE INCLUDING ANTENNA

(71) Applicant: Samsung Electronics Co., Ltd., Gyeonggi-do (KR)

(72) Inventors: Seong Beom Hong, Seoul (KR); Hyung Wook Kim, Gyeonggi-do (KR); Sung Chul Park, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 17/946,130

(22) Filed: Sep. 16, 2022

(65) Prior Publication Data

US 2023/0083309 A1 Mar. 16, 2023

Related U.S. Application Data

(63) Continuation of application No. 17/239,814, filed on Apr. 26, 2021, now Pat. No. 11,450,944, which is a (Continued)

(30) Foreign Application Priority Data

Nov. 1, 2017 (KR) ........................ 10-2017-0144972

(51) Int. Cl.

*H01Q 1/22* (2006.01)
*H01Q 1/24* (2006.01)
(Continued)

(52) U.S. Cl.

CPC ........... *H01Q 1/2283* (2013.01); *H01Q 1/243* (2013.01); *H01Q 1/52* (2013.01); *H01Q 3/2635* (2013.01);
(Continued)

(58) Field of Classification Search

CPC ........ H01Q 1/2283; H01Q 1/243; H01Q 1/52; H01Q 3/2635; H01Q 3/40; H01Q 5/42;
(Continued)

(56) References Cited

U.S. PATENT DOCUMENTS 7,271,771 B2 9/2007 Usui et al.
8,610,629 B2 12/2013 Pascolini et al.
(Continued)

FOREIGN PATENT DOCUMENTS

CN 202602721 U 12/2012
JP 3212835 U 10/2017
(Continued)

OTHER PUBLICATIONS

European Office Action dated Nov. 15, 2022.
Korean Office Action dated Jan. 2, 2023.

*Primary Examiner* — Hoang V Nguyen
(74) *Attorney, Agent, or Firm* — Cha & Reiter, LLC

(57) ABSTRACT

An electronic device is provided. The electronic device may comprise a housing comprising: a front plate facing a first direction, a back plate facing a second direction opposite to the first direction, and a side surface which surrounds the front plate and the back plate, wherein the front plate includes a screen area and a bezel area; a display exposed through the screen area of the front plate; a first circuit board disposed between the display and the back plate and including a first surface facing the display and a second surface facing the back plate; a first antenna array overlaid on the bezel area in the first surface; a second antenna array disposed on the second surface; and a wireless communication circuit disposed on the first circuit board and electrically connected with the first antenna array and the second antenna array, wherein the wireless communication circuit is configured to: form a beam which has directionality in the
(Continued)

first direction using the first antenna array and form a beam which has directionality in the second direction using the second antenna array.

28 Claims, 14 Drawing Sheets

Related U.S. Application Data continuation of application No. 16/177,535, filed on Nov. 1, 2018, now Pat. No. 10,992,023.

(51) Int. Cl.

| | |
|---|---|
| ***H01Q 1/52*** | (2006.01) |
| ***H01Q 3/26*** | (2006.01) |
| ***H01Q 3/40*** | (2006.01) |
| ***H01Q 5/42*** | (2015.01) |
| ***H01Q 5/48*** | (2015.01) |
| ***H01Q 11/14*** | (2006.01) |
| ***H01Q 21/06*** | (2006.01) |
| ***H01Q 21/24*** | (2006.01) |
| ***H01Q 21/28*** | (2006.01) |

(52) U.S. Cl.
CPC ................. *H01Q 3/40* (2013.01); *H01Q 5/42* (2015.01); *H01Q 5/48* (2015.01); *H01Q 11/14* (2013.01); *H01Q 21/062* (2013.01); *H01Q 21/245* (2013.01); *H01Q 21/28* (2013.01)

(58) Field of Classification Search
CPC ........ H01Q 5/48; H01Q 11/14; H01Q 21/062; H01Q 21/245; H01Q 21/065; H01Q 21/28; H01Q 25/005
See application file for complete search history.

(56) References Cited

U.S. PATENT DOCUMENTS

| | | | | |
|---|---|---|---|---|
| 9,276,319 | B2 | 3/2016 | Vazquez et al. | |
| 9,667,290 | B2 | 5/2017 | Ouyang et al. | |
| 9,806,422 | B2 | 10/2017 | Garcia et al. | |
| 9,917,368 | B2 | 3/2018 | Garcia et al. | |
| 10,056,683 | B2 | 8/2018 | Sharawi et al. | |
| 10,084,490 | B2 | 9/2018 | Ouyang et al. | |
| 10,218,396 | B2 | 2/2019 | Son et al. | |
| 10,305,172 | B2 | 5/2019 | Noori et al. | |
| 10,594,344 | B2 | 3/2020 | Son et al. | |
| 10,680,663 | B2 | 6/2020 | Ouyang et al. | |
| 10,727,576 | B2 | 7/2020 | Kim et al. | |
| 11,018,706 | B2 | 5/2021 | Son et al. | |
| 11,069,968 | B2 | 7/2021 | Kim et al. | |
| 11,276,921 | B2 | 3/2022 | Kim et al. | |
| 2006/0077104 | A1 | 4/2006 | Usui et al. | |
| 2009/0122847 | A1 | 5/2009 | Nysen | |
| 2010/0177012 | A1 | 7/2010 | Morrow | |
| 2011/0291896 | A1 | 12/2011 | Pascolini et al. | |
| 2014/0333495 | A1 | 11/2014 | Vazquez et al. | |
| 2016/0056544 | A1 | 2/2016 | Garcia et al. | |
| 2016/0172761 | A1 | 6/2016 | Garcia et al. | |
| 2016/0308563 | A1 | 10/2016 | Ouyang et al. | |
| 2017/0033812 | A1 | 2/2017 | Son et al. | |
| 2017/0069958 | A1 | 3/2017 | Ko et al. | |
| 2017/0125901 | A1 | 5/2017 | Sharawi et al. | |
| 2017/0250460 | A1 | 8/2017 | Shin et al. | |
| 2017/0302306 | A1 | 10/2017 | Ouyang et al. | |
| 2017/0309992 | A1* | 10/2017 | Noori ..................... | H01Q 13/06 |
| 2017/0317418 | A1 | 11/2017 | Garcia et al. | |
| 2018/0076526 | A1 | 3/2018 | Garcia et al. | |
| 2018/0323507 | A1 | 11/2018 | Sharawi et al. | |
| 2018/0342801 | A1 | 11/2018 | Sharawi et al. | |

FOREIGN PATENT DOCUMENTS

| | | | |
|---|---|---|---|
| KR | 10-2017-0013682 | A | 2/2017 |
| KR | 10-2017-0020138 | A | 2/2017 |
| KR | 10-2017-0100972 | A | 9/2017 |
| WO | 2016/168432 | A1 | 10/2016 |

* cited by examiner

| Name | X | Y |
|---|---|---|
| m1 | 22.7638 | -9.5209 |
| m2 | 28.2915 | -14.6408 |
| m3 | 35.9548 | -3.1632 |
| m4 | 34.3216 | -4.8802 |
| m5 | 21.2563 | -3.6311 |
| m6 | 26.0302 | -12.3923 |
| m7 | 24.5226 | -14.5281 |
| m8 | 28.0402 | 16.6178 |

300B

ELECTRONIC DEVICE INCLUDING ANTENNA

CROSS-REFERENCE TO RELATED APPLICATION(S)

This application is a Continuation of U.S. patent application Ser. No. 17/239,814 filed on Apr. 26, 2021, which is a continuation of U.S. patent application Ser. No. 16/177,535 filed on Nov. 1, 2018 and assigned U.S. Pat. No. 10,992,023 issued on Apr. 17, 2021 which is based on and claims priority under 35 U.S.C. § 119 to Korean Patent Application No. 10-2017-0144972, filed on Nov. 1, 2017, in the Korean Intellectual Property Office, the disclosure of which is incorporated by reference herein its entirety.

BACKGROUND

1. Field

The present disclosure relates to antenna technology of transmitting and receiving extremely high frequencies.

2. Description of Related Art

With a rapid increase in mobile traffic, fifth generation (5G) technologies based on an extremely high frequency band of 20 GHz or higher have been developed. Extremely high frequency signals may include millimeter waves having frequency bands from 30 GHz to 300 GHz. When extremely high frequencies are used, an antenna and device may become smaller and thinner due to their short wavelengths. Furthermore, a relatively larger number of antennas may be loaded into the same area due to their short wavelengths, so signals may be concentrated and transmitted in a specific direction. Moreover, since a large bandwidth is available, a larger amount of information may be transmitted.

The above information is presented as background information only to assist with an understanding of the present disclosure. No determination has been made, and no assertion is made, as to whether any of the above might be applicable as prior art with regard to the present disclosure.

SUMMARY

An extremely high frequency may have strong straightness, resulting in high path loss. For example, a radio frequency integrated circuit (RFIC) for the extremely high frequency may be disposed close to an antenna. Moreover, beamforming technology for steering signals may be used to use the extremely high frequency having the strong straightness.

Aspects of the present disclosure are to address at least the above-mentioned problems and/or disadvantages and to provide at least the advantages described below. Accordingly, an aspect of the present disclosure is to provide an electronic device including a plurality of mounted antennas which have directionality in the direction of at least one of a front plate, a back plate, or a side surface.

In accordance with an aspect of the present disclosure, an electronic device is provided. The electronic device may comprise a housing comprising: a front plate facing a first direction, a back plate facing a second direction opposite to the first direction, and a side surface which surrounds the front plate and the back plate, wherein the front plate includes a screen area and a bezel area; a display exposed through the screen area of the front plate; a first circuit board disposed between the display and the back plate and including a first surface facing the display and a second surface facing the back plate; a first antenna array overlaid on the bezel area in the first surface; a second antenna array disposed on the second surface; and a wireless communication circuit disposed on the first circuit board and electrically connected with the first antenna array and the second antenna array, wherein the wireless communication circuit is configured to: form a beam which has directionality in the first direction using the first antenna array and form a beam which has directionality in the second direction using the second antenna array.

In accordance with another aspect of the present disclosure, an electronic device is provided. The electronic device, comprises a housing comprising: a front plate, a back plate facing a direction opposite to the front plate, and a side member which surrounds a space between the front plate and the back plate and wherein the housing is integrated or attached with the back plate; a touch screen display located in the housing and exposed through a first portion of the front plate; an antenna array located in the housing when viewed from above the front plate and comprising a plurality of isolated antenna elements disposed in a gap between the touch screen display and the side member; and a wireless communication circuit located in the housing and electrically connected with the antenna array, wherein the wireless communication circuit is configured to form a beam using the antenna array.

According to embodiments disclosed in the present disclosure, the electronic device may include a plurality of mounted antennas which have directionality in the direction of at least one of a front plate, a back plate, or a side surface of the electronic device.

In addition, various effects directly or indirectly ascertained through the present disclosure may be provided.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1A:
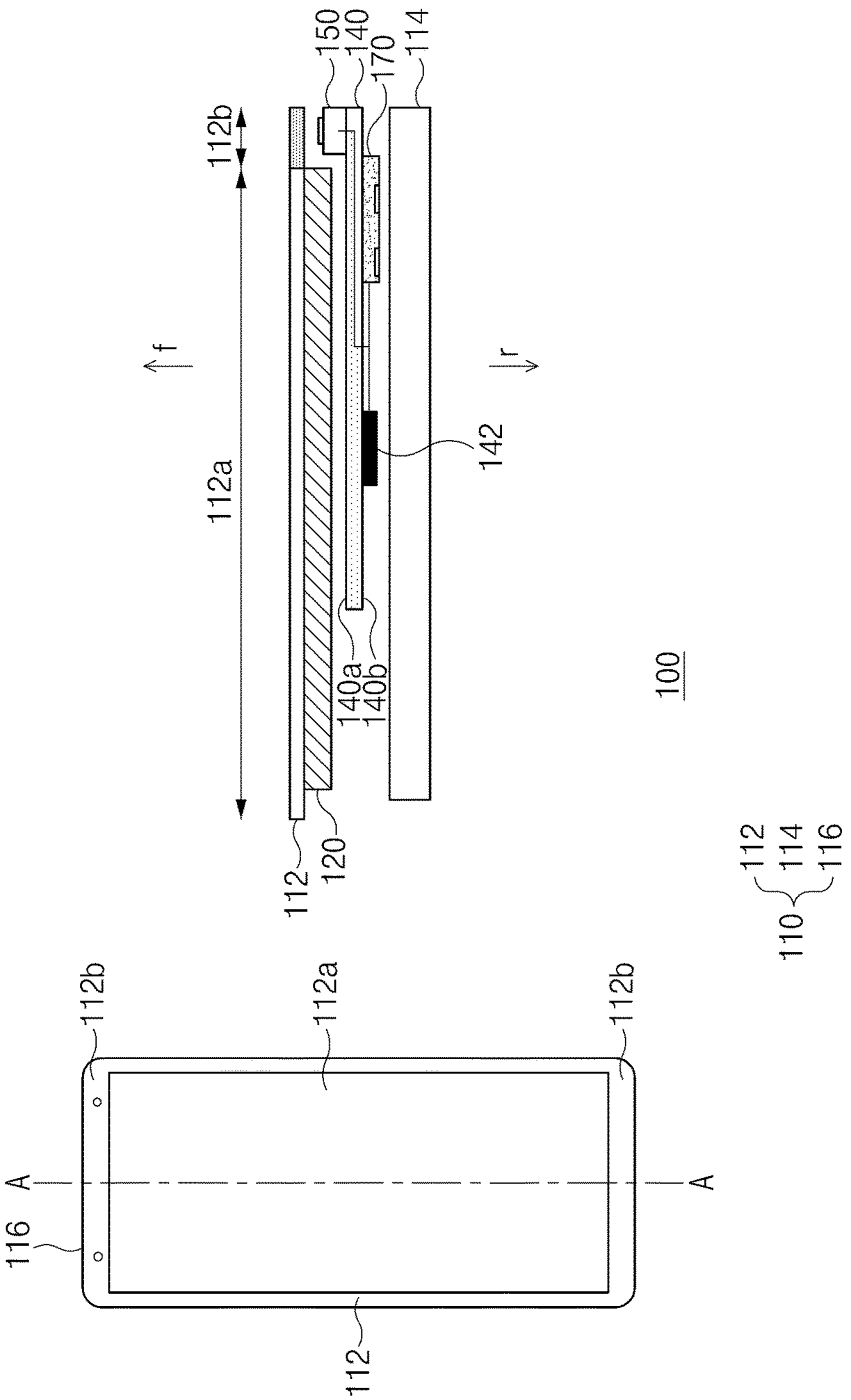
FIG. 1A is a perspective view illustrating an electronic device according to an embodiment.

Hereinafter, various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar components may be marked by similar reference numerals.

In the present disclosure, the expressions "have", "may have", "include" and "comprise", or "may include" and "may comprise" used herein indicate existence of corresponding features (e.g., components such as numeric values, functions, operations, or parts) but do not exclude presence of additional features.

In the present disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in the present disclosure may be used to refer to various components regardless of the order and/or the priority and to distinguish the relevant components from other components, but do not limit the components. For example, "a first user device" and "a second user device" indicate different user devices regardless of the order or priority. For example, without departing the scope of the present disclosure, a first component may be referred to as a second component, and similarly, a second component may be referred to as a first component.

It will be understood that when a component (e.g., a first component) is referred to as being "(operatively or communicatively) coupled with/to" or "connected to" another component (e.g., a second component), it may be directly coupled with/to or connected to the other component or an intervening component (e.g., a third component) may be present. In contrast, when a component (e.g., a first component) is referred to as being "directly coupled with/to" or "directly connected to" another component (e.g., a second component), it should be understood that there are no intervening component (e.g., a third component).

According to the situation, the expression "configured to" used in the present disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the present disclosure are used to describe specified embodiments and are not intended to limit the scope of the present disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of the present disclosure. In some cases, even if terms are terms which are defined in the present disclosure, they may not be interpreted to exclude embodiments of the present disclosure.

An electronic device according to various embodiments of the present disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs)), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automated teller machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of the present disclosure may not be limited to the above-described electronic devices and may include other electronic devices and new electronic devices according to the development of technologies.

Hereinafter, electronic devices according to various embodiments will be described with reference to the accompanying drawings. In the present disclosure, the term “user” may refer to a person who uses an electronic device or may refer to a device (e.g., an artificial intelligence electronic device) that uses the electronic device.

FIG. 1A is a perspective view illustrating an electronic device according to an embodiment.

Referring to FIG. 1A, an electronic device 100 according to an embodiment may be surrounded by a housing 110. The housing 110 may include a front plate 112, a back plate 114, and a side surface 116 which surrounds the front plate 112 and the back plate 114. For example, the side surface 116 may be integrated with the back plate 114 or may be attached to the back plate 114.

For example, the front plate 112 may face a first direction f orthogonal to a plane formed by the front plate 112. The front plate 112 of the housing 110 may include a screen area 112*a* and a bezel area 112*b*. The back plate 114 may face a second direction r which is opposite to the first direction f and orthogonal to a plane formed by the back plate 114.

In an embodiment, the electronic device 100 may include a display 120 located in the housing 110. The display 120 may be exposed through the screen area 112*a* of the front plate 112. For example, the front plate 112 may be formed of glass. The glass may operate as, for example, a director for an antenna array included in the electronic device 100.

In an embodiment, the electronic device 100 may include a first circuit board 140 disposed between the display 120 and the back plate 114. The first circuit board 140 may include a first surface 140*a* adjacent to or facing the display 120 and a second surface 140*b* adjacent to or facing the back plate 114.

In an embodiment, the electronic device 100 may include a plurality of antenna arrays having different directions. The plurality of antennas may be referred to as, for example, a fifth generation (5G) antenna.

In an embodiment, the electronic device 100 may include a first antenna array 150 disposed on or on an area overlaid with the bezel area 112*b* of the front plate 112 in the first surface 140*a* of the first circuit board 140. A first signal transmitted and received via the first antenna array 150 may be the first direction f. The first signal may be transmitted to the outside through the bezel area 112*b* from the first antenna array 150.

In an embodiment, the electronic device 100 may include a second antenna array 170 disposed on the second surface 140*b* of the first circuit board 140. A second signal transmitted and received via the second antenna array 170 may be in the second direction r. The second signal may be transmitted to the outside through the back plate 114 from the second antenna array 170.

In an embodiment, the electronic device 100 may include a wireless communication circuit 142 which is electrically connected with the first antenna array 150 and the second antenna array 170. The wireless communication circuit 142 may be located on the first circuit board 140. For example, the wireless communication circuit 142 may be arranged on the first surface 140*a* or the second surface 140*b* of the first circuit board 140. The wireless communication circuit 142 may be referred to as, for example, a radio frequency integrated circuit (RFIC). The communication circuit 142, the first antenna array 150, and the second antenna array 170 may be disposed on the same circuit board, resulting in a shorter distance between the communication circuit 142, the first antenna array 150, and the second antenna array 170.

In an embodiment, the wireless communication circuit 142 may form a beam using the first antenna array 150 and the second antenna array 170. For example, the wireless communication circuit 142 may form a beam which has a first direction f using the first antenna array 150. The wireless communication circuit 142 may form a beam which has a second direction r using the second antenna array 170.

In an embodiment, a plurality of antenna elements included in the first antenna array 150 may be aligned around the screen area 112*a*, when viewed from above the front plate 112. For example, the first antenna array 150 may be received in the housing 110 overlaid with the bezel area 112*b*, when viewed from above the front plate 112. For example, the plurality of antenna elements included in the first antenna array 150 may be located in a gap between the display 120 and the side surface 116.

In an embodiment, a black matrix (BM) area of the display 120 may be overlaid with the bezel area 112*b* of the front plate 112. A BM area can be a cross-section of the display for blocking light extraneous to the display that would otherwise reducing contrast. A signal emitted from the first antenna array 150 may be transmitted in the first direction f via the BM area of the display 120 and the bezel area 112*b* of the front plate 112.

For example, an opaque layer may be disposed between the front plate 112 of the housing 110 and the first antenna array 150. The opaque layer may include, for example, a black mask layer. The bezel area 112*b* of the front plate 112 may be referred to as an opaque layer.

In an embodiment, one area (not shown) of the back plate 114 of the housing 110, overlaid with the second antenna array 170, may be formed of a non-conductive material. A signal emitted from the second antenna array 170 may be transmitted in the second direction r through the one region formed of the non-conductive material.

In various embodiments, the wireless communication circuit 142 may transmit and receive a signal of an extremely high frequency band of 20 GHz or higher using the first antenna array 150 and the second antenna array 170.

In various embodiments, each of the first antenna array 150 and the second antenna array 170 may include a plurality of antenna elements. The antenna elements may be referred to as, for example, a patch antenna, a dipole antenna, a monopole antenna, or the like.

Figure 1B:
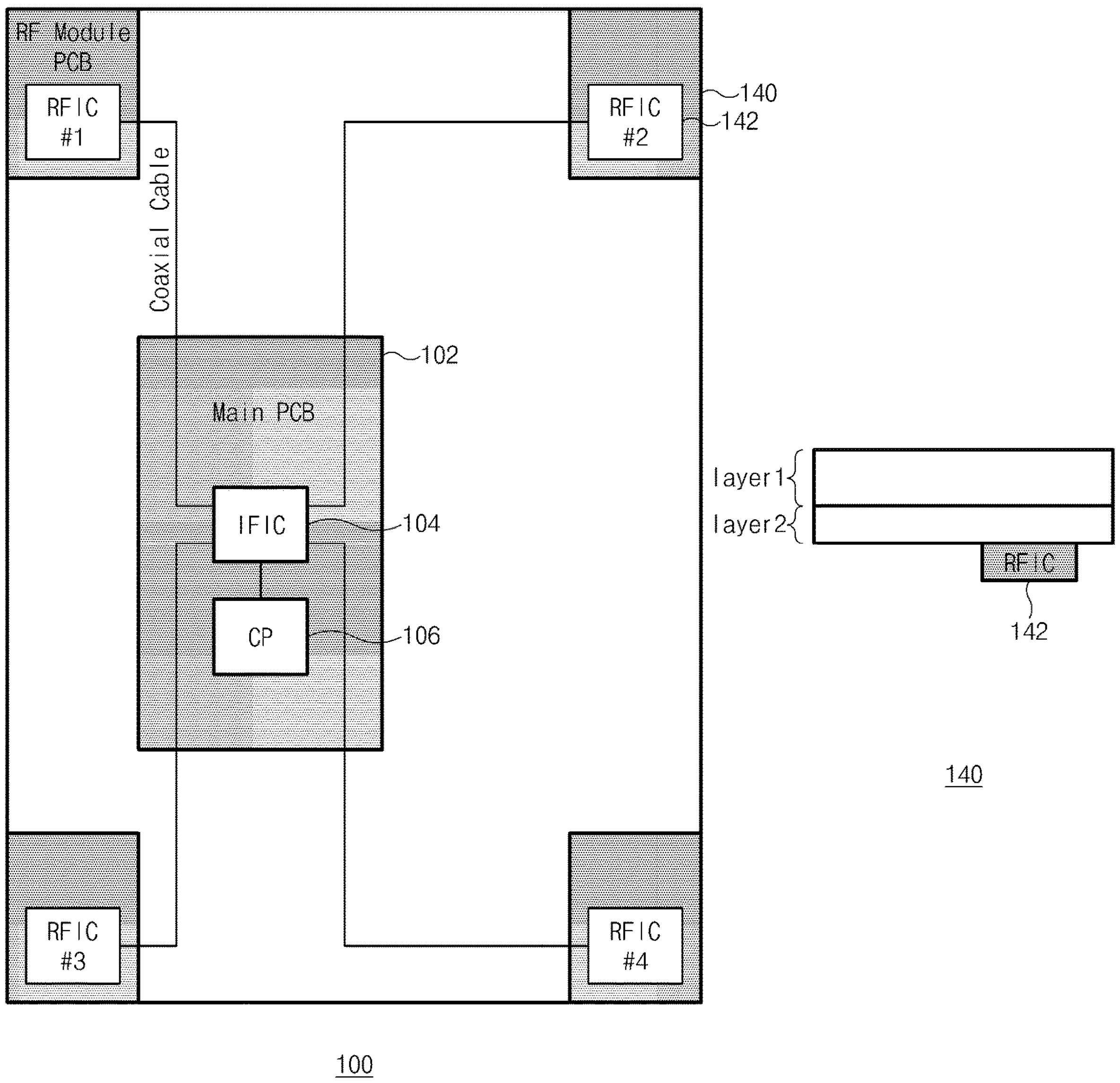
FIG. 1B is a view illustrating a structure where a circuit board in an electronic device is arranged, according to an embodiment.

FIG. 1B is a view illustrating a structure where a circuit board in an electronic device is arranged, according to an embodiment. A description of FIG. 1B refers to reference numerals shown in FIG. 1A.

Referring to FIG. 1B, an electronic device 100 according to an embodiment may include a second circuit board 102 located in a housing 110. For example, the second circuit board 102 may be referred as a main printed circuit board (PCB).

In various embodiments, the electronic device 100 may include a third antenna array (e.g., a third antenna array 270 of FIG. 2C) for transmitting a signal to a side surface 116. An RFIC 142 (e.g., a wireless communication circuit 142 of FIG. 1A) on a first circuit board 140 may be disposed adjacent to a first antenna array 150 to the third antenna.

In an embodiment, the first circuit board 140 may be located adjacent to the side surface 116 of the electronic device 100. For example, the electronic device 100 may include the at least one first circuit board 140. In FIG. 1B, when the electronic device 100 includes the housing 110 of a substantially rectangular shape (including a rectangular shape with rounded corners), there are the first circuit boards 140 respectively located at corners of the side surface 116.

In an embodiment, the electronic device 100 may include an intermediate frequency integrated circuit (IFIC) 104 and a processor (e.g., a communication processor (CP)) 106, disposed on the second circuit board 102. The processor 106 may directly or indirectly control a wireless communication circuit including the IFIC 104 and the RFIC 142. The processor 104 may control the IFIC 104 to convert a signal of a low frequency band which is a baseband into a signal of an intermediate frequency band. The processor 104 may control the RFIC 142 to convert a signal of an intermediate frequency band into a signal of a high frequency band.

In an embodiment, the first circuit board 140 may include two or more layers. For example, the first circuit board 140 may include layer 1 on which an antenna array is formed and layer 2, on which the RFIC 142 is disposed, to which an RF signal is delivered. It shall be understood that the terms “layer 1” and “layer 2” are merely used to distinguish each layer from the other, and are not intended to imply any greater or less importance or any relationship in attributes between the layers, unless specifically stated otherwise.

FIGS. 2A to 2D are perspective views illustrating an electronic device according to an embodiment.

In various embodiments, a first antenna array 250 (e.g., a first antenna array 150 of FIG. 1A) and a second antenna array (e.g., a second antenna array 170 of FIG. 1A) may be configured as a plurality of patch antennas. Referring to FIGS. 2A to 2D, an embodiment is exemplified as the first antenna array 250 and the second antenna array 270 are configured as the plurality of patch antennas. However, embodiments are not limited thereto. For example, the first antenna array 250 and the second antenna array 270 may be configured as other antennas such as dipole antennas, monopole antennas, or the like.

Referring to FIGS. 2A to 2D, an electronic device 200 according to an embodiment may include a support member 230 for supporting a display 220. For example, the support member 230 may be formed of a conductive material (e.g., aluminum) to maintain the stiffness of the electronic device 200.

In an embodiment, the support member 230 may include at least one through-hole 232 formed between a bezel area 212*b* of a front plate 212 and the first antenna 250. The through-hole 232 may be formed through, for example, the support member 230 in a first direction f.

In an embodiment, one region of the support member 230 including the through-hole 232 may be close or attached to a first circuit board 240. The one region may be formed thicker than, for example, the other region to be close to the first circuit board 240. For example, the support member 230 may extend into a gap between the display 220 and a side surface (e.g., 114 of FIG. 1A). The through-hole 232 may be formed in the extended portion.

In an embodiment, a conductive path through the through-hole may facilitate a signal transmitted and received via the first antenna array 250 to pass through the through-hole 232. For example, the electronic device 200 may include a plurality of through-holes. The plurality of through-holes may have shapes or sizes corresponding to a plurality of antenna elements included in the first antenna array 250. A signal transmitted and received via the antenna elements may pass through the through-holes respectively (via respective conductive paths) corresponding to the antenna elements.

For example, referring to FIGS. 2A to 2D, the first antenna array 250 may be formed with a plurality of circular patch antennas. The through-hole 232 may be formed in a circular shape to correspond to the patch antennas. A signal transmitted and received from the patch antennas may pass through the circular through-hole 232.

According to an embodiment, the direction of a beam formed through the first antenna array 250 may be enhanced through the through-hole 232 of the support member 230. For another example, isolation between the plurality of antenna elements included in the first antenna array 250 may increase through the through-hole 232 of the support member 230.

In an embodiment, the through-hole 232 of the support member 230 may be partially or completely filled with an insulating material. The insulating material may enhance directionality of the first antenna array 250 and stiffness of the support member 230.

In various embodiments, a wireless communication circuit (e.g., a wireless communication circuit 142 of FIG. 1A) may transmit and receive signals of a plurality of frequency bands formed based on the size and shape of the through-hole 232. A related description will be given with reference to FIG. 3B.

Figure 2A:
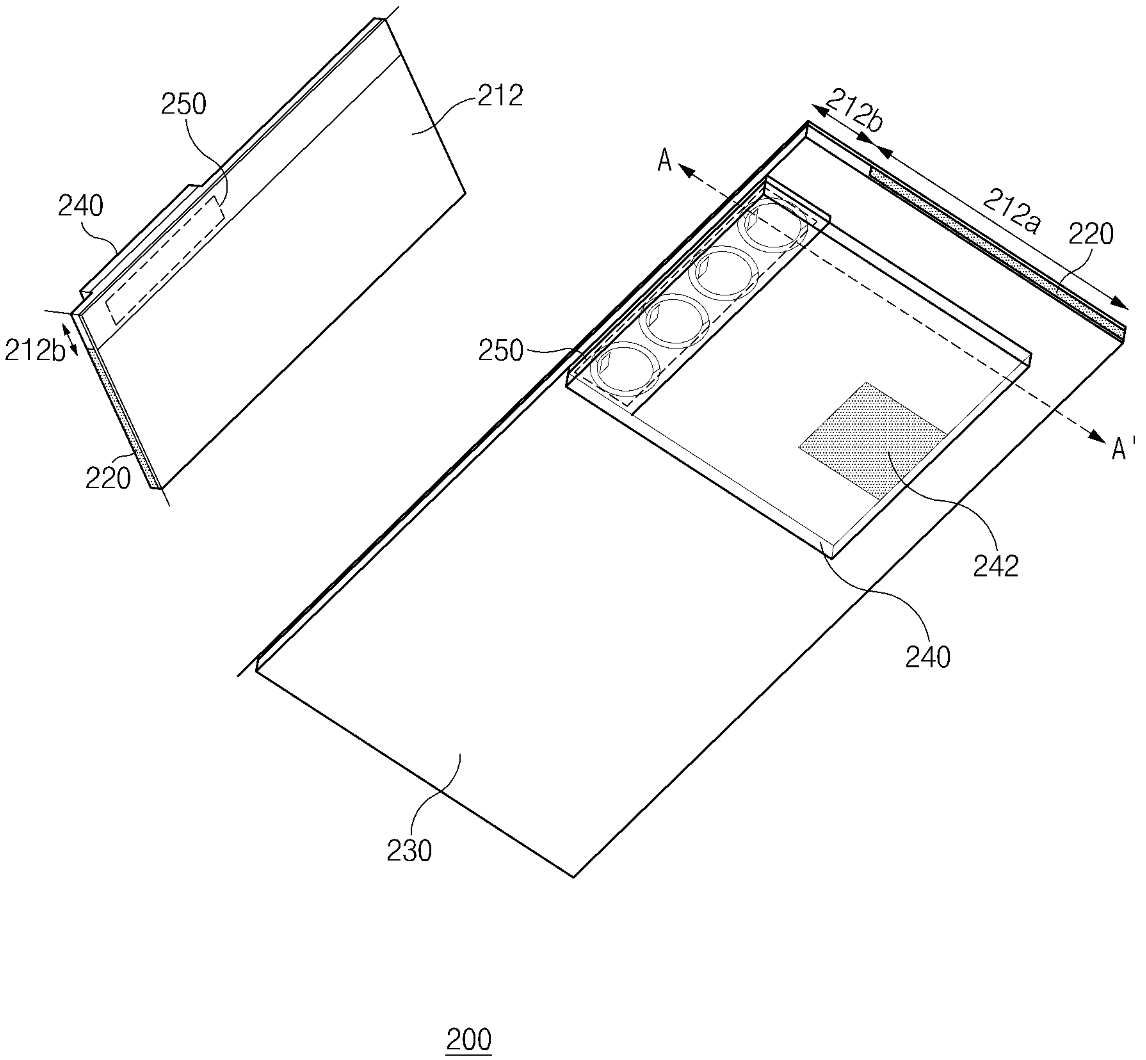
FIG. 2A, FIG. 2B, FIG. 2C, and FIG. 2D are perspective views illustrating an electronic device according to an embodiment.
Figure 2B:
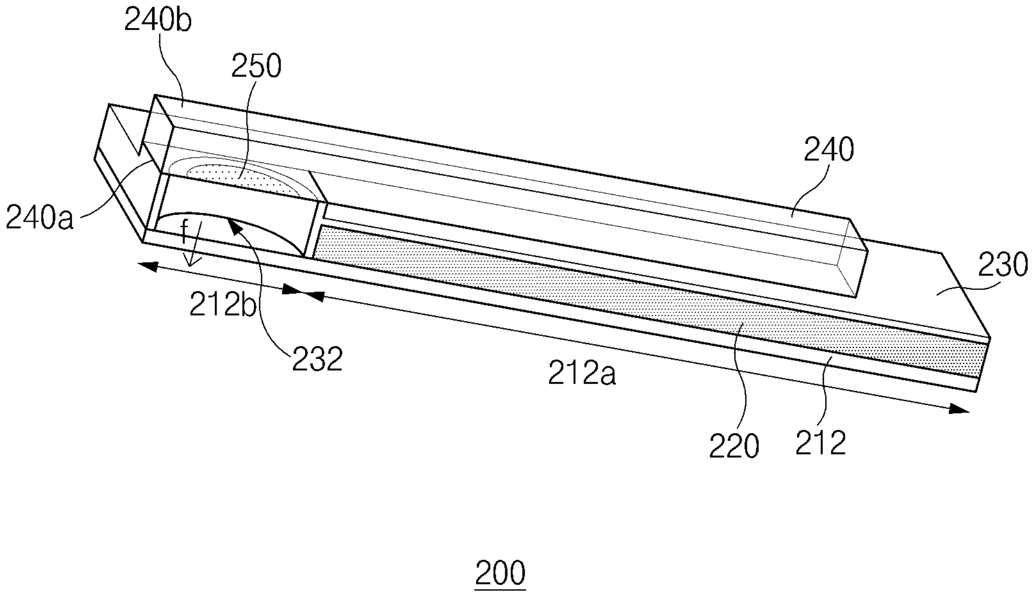
Figure 2C:
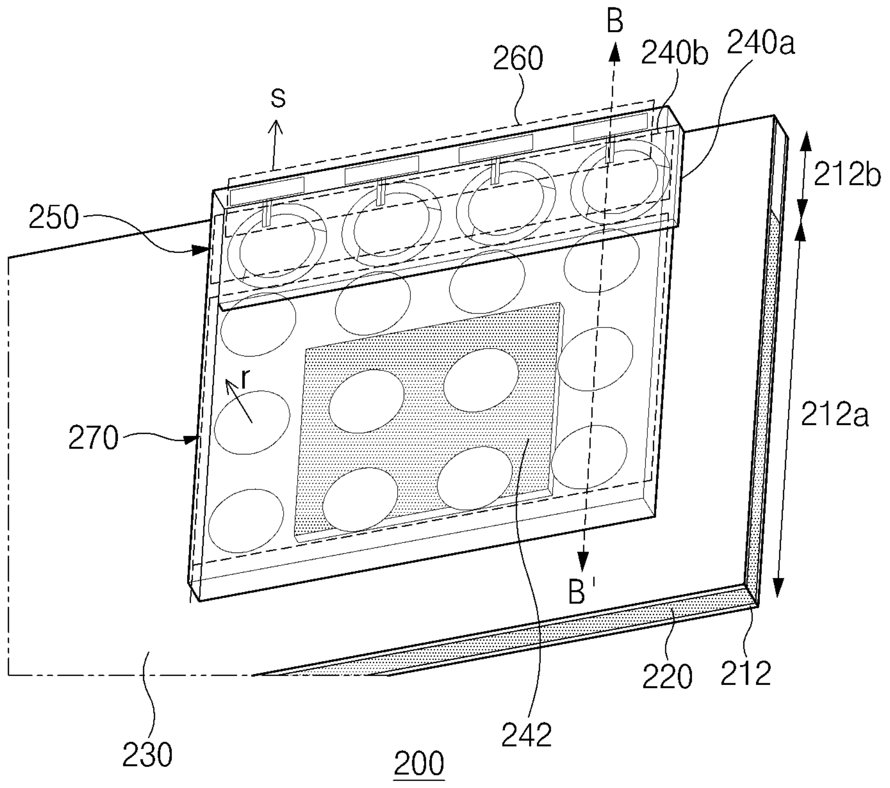
Figure 2D:
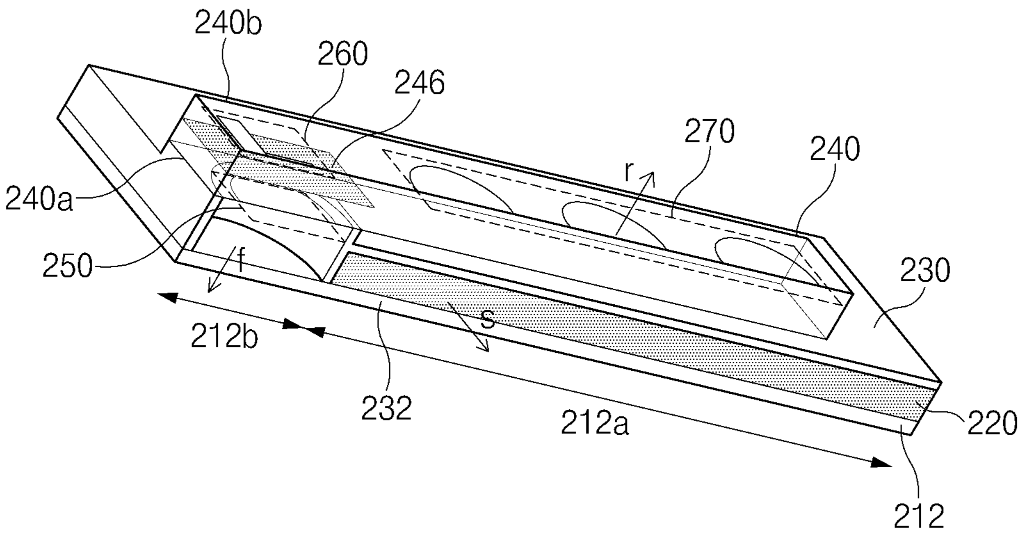

Referring to FIGS. 2C and 2D, the electronic device 200 according to various embodiments may include a third antenna array 260 for transmitting a signal to a side surface (e.g., a side surface 116 of FIG. 1A). For example, the side surface may face a third direction s orthogonal to the first direction f of the front surface 212 and a second direction r of a back plate (e.g., 114 of FIG. 1A). The electronic device 200 may form a beam in the first direction f, the second direction r, or the third direction s, which are orthogonal to each other, using the first antenna array 250, the second antenna array 270, or the third antenna array 260.

In an embodiment, the wireless communication circuit 242 may be electrically connected with the third antenna array 260 via a conductive path. The wireless communication circuit 242 may form a beam which has a third direction s, using the third antenna array 260. The wireless communication circuit 242 may transmit and receive a signal of a frequency band of 20 GHz or higher using the third antenna array 260. The third antenna array 260 may be referred to as, for example, a 5G antenna.

An embodiment is exemplified as a plurality of antenna elements forming the third antenna array 260 are a dipole antenna. However, embodiments are not limited thereto. For example, the third antenna array 260 may be referred to as a monopole antenna, an end-fire antenna, a patch antenna, or the like.

In various embodiments, the first antenna array 250 disposed adjacent to the bezel area 212*b* of the front plate 212 and the third antenna array 260 disposed adjacent to the side surface (e.g., 116 of FIG. 1A) may be located close to each other. A conductive plate 246 may be disposed to enhance isolation between the first antenna array 250 and the third antenna array 260. The conductive plate 246 may be located between, for example, the first antenna array 250 and the third antenna array 260.

In various embodiments, a conductive pattern or path (not shown) may be disposed on a surface of the bezel area 212*b* of the front plate 212. For example, when the front plate 212 is formed of glass, a conductive material may be printed on a surface of the glass. The conductive pattern may enhance directionality of the first antenna array 250 by playing a role as a director. For another example, the conductive pattern may have an influence on a resonant frequency of the first antenna array 250. For example, the resonant frequency of the first antenna array 250 may vary with a shape or size of the conductive pattern.

Figure 3A:
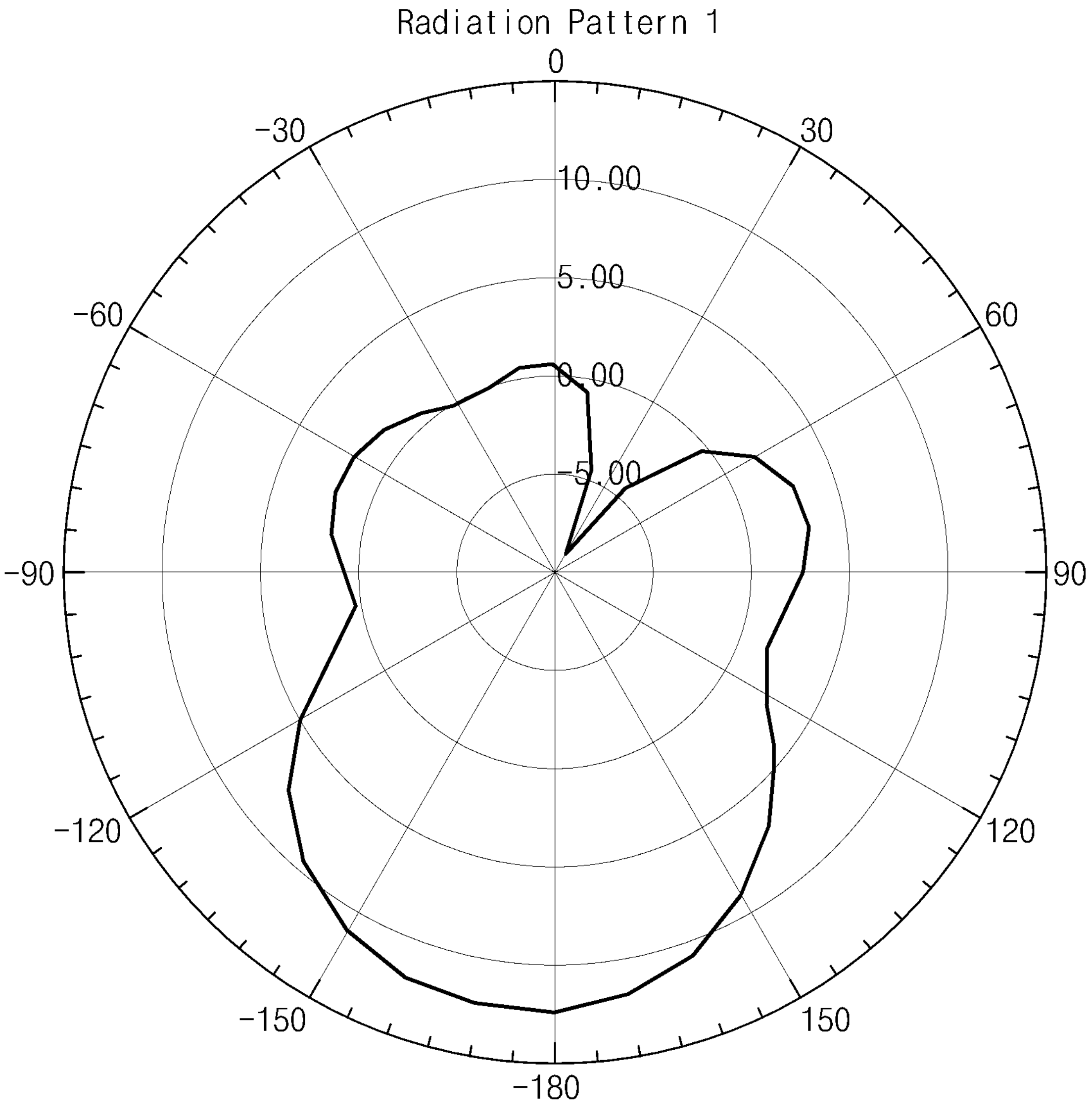
FIG. 3A and FIG. 3B are views illustrating performance of an antenna array having directionality in the direction of a front surface of an electronic device according to an embodiment.
Figure 3B:
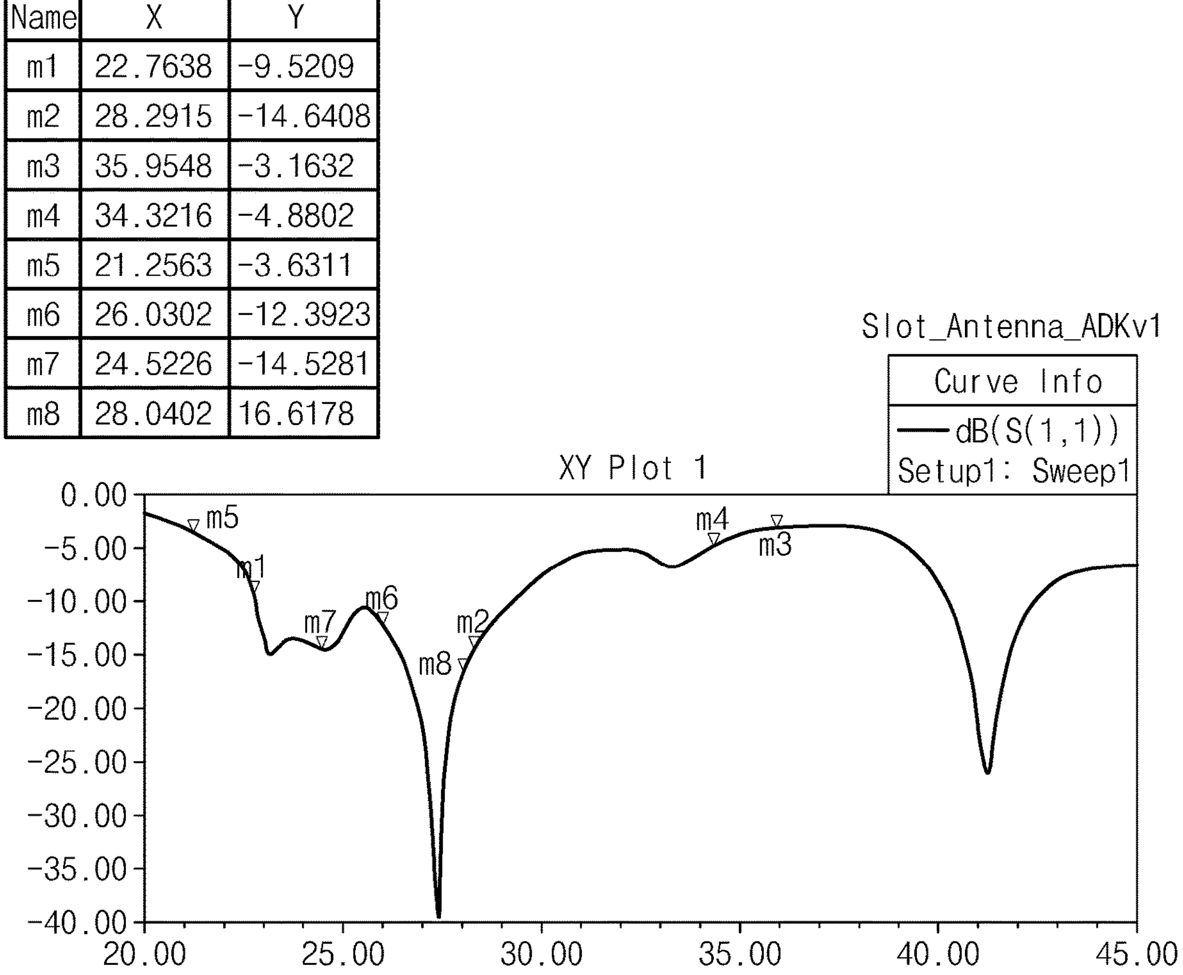

FIGS. 3A and 3B are views illustrating performance of an antenna array the direction of a front surface of an electronic device according to an embodiment. The performance of a first antenna array 250 (configured as a patch antenna) of an electronic device 200 described with reference to FIGS. 2A and 2B is measured.

Referring to Table 1 below, an antenna gain measured with respect to the first antenna array 250 is shown. A gain of the patch antenna included in the first antenna array 250 is measured as 6.65 dB. A gain of the patch antenna when an insulating material (director) is added to a through-hold corresponding to the patch antenna is measured as 7.62 dB. It may be seen that directionality is enhanced by the insulating material. A gain of the first antenna gain 250 configured with four patch antenna arrays is measured as 12.39 dB. A gain by beamforming is generated as 4.77 dB. Furthermore, an isolation value of the first antenna array 250 is measured as −21.96.

TABLE 1

| | Antenna Element | +Director | 4X Array Gain |
|---|---|---|---|
| Peak Gain(dB) | 6.65 | 7.62 | 12.39 |
| Isolation(dB) | — | — | −21.96 |

Referring to FIG. 3A, a radiation pattern of the first antenna array 250 is shown. A beam pattern of the first antenna array 250 is formed in the direction of −180 degrees. It may be seen that a beam pattern is formed in a first direction f a front plate 212 of the electronic device 200 faces.

Referring to FIG. 3B, a return loss graph of the first antenna array 250 is shown. In the first antenna array 250, resonance may occur at about 27.5 GHz. Furthermore, it may be seen that additional resonance occurs at about 41 GHz. The additional resonance may occur by interaction between the first antenna array 250 and a plurality of through-holes. For example, a frequency of the additional resonance may vary with a size and/or shape of a through-hole 232 of FIG. 2B. In various embodiments, the first antenna array 250 may operate as a dual-band antenna according to the through-hole 232.

Figure 4:
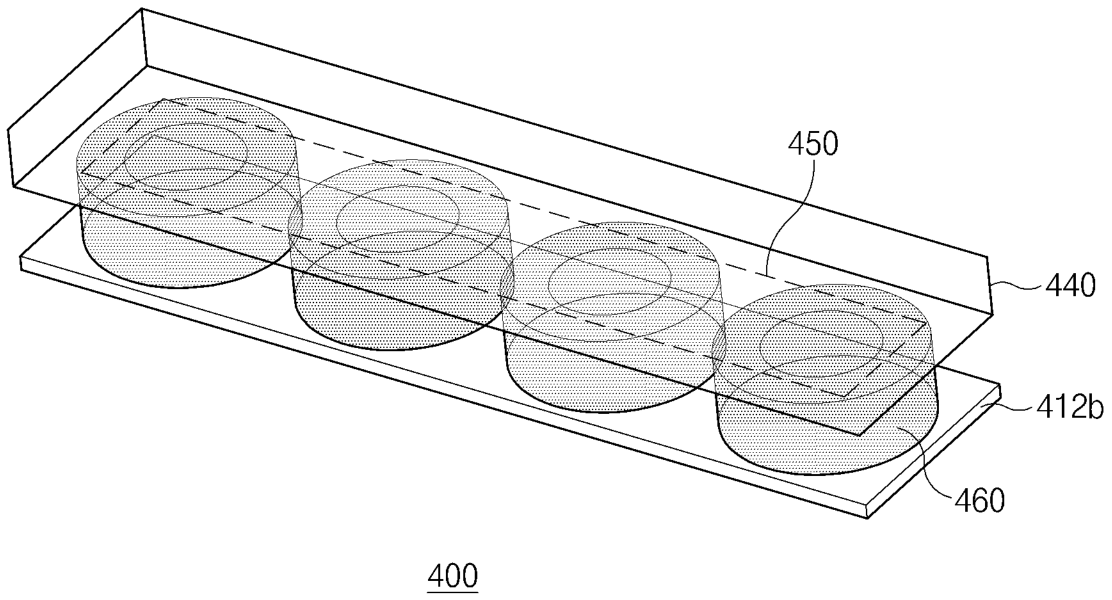
FIG. 4 is a perspective view illustrating an electronic device according to various embodiments.

FIG. 4 is a perspective view illustrating an electronic device according to various embodiments.

In various embodiments, an electronic device 400 (e.g., an electronic device 200 of FIG. 2A) may include a dielectric 460 which is disposed between a bezel area **412*b* (e.g., a bezel area 212*b* of FIG. 2A) of a front plate (e.g., a front plate 212 of FIG. 2A) and a first antenna array 450 (e.g., a first antenna array 250 of FIG. 2A) and is formed of a non-conductive material (e.g., a dielectric). The dielectric 460 may support a first circuit board 440 (e.g., a first circuit board 240 of FIG. 2**A).

For example, a through-hole 232 of a support member 230 of FIG. 2B may be replaced by the dielectric 460. A signal formed by the first antenna array 450 may be induced in a first direction f through the dielectric 460. The signal may be radiated through the bezel area **412*b***.

In various embodiments, the first antenna array 450 may have directionality in the first direction f through the dielectric 460. For example, a signal transmitted or received using the first antenna array 450 by a wireless communication circuit may increase in directionality by the dielectric 460.

Figure 5:
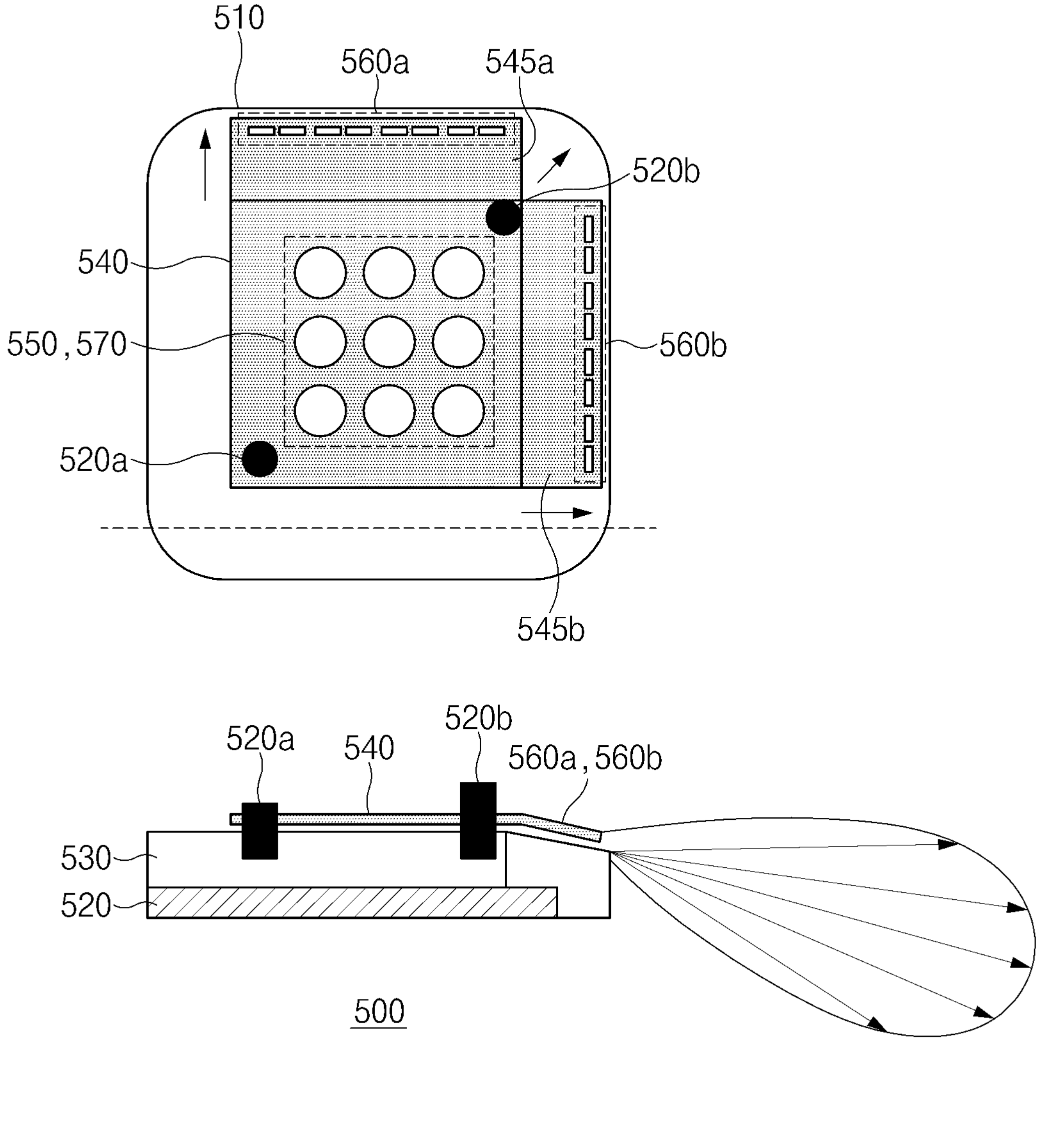
FIG. 5 is a view illustrating a structure where a circuit board with a plurality of antenna arrays is arranged, according to an embodiment.

FIG. 5 is a view illustrating a structure where a circuit board with a plurality of antenna arrays is arranged, according to an embodiment.

In various embodiments, an electronic device 500 may include second circuit boards **545*a* and 545*b* combined with a first circuit board 540. Each of the second circuit boards 545*a* and 545*b*** may be referred to as a PCB or a flexible PCB (FPCB).

In various embodiments, third antenna arrays **560*a* and 560*b* may be disposed on second circuit boards 545*a* and 545*b*, respectively. The second circuit boards 545*a* and 545*b* may be disposed between a display 520 (e.g., a display 220 of FIG. 2A) and a back plate of a housing 510 and may be disposed adjacent to a side surface (e.g., a side surface 116 of FIG. 1A) of the housing 510. The third antenna arrays 560*a* and 560*b* may be disposed adjacent to the side surface of the housing 510**.

According to various embodiments, the electronic device 500 may include connection means **520*a* and 520*b* (e.g., a screw, a nut, and the like) for connecting the first circuit board 540 (e.g., a first circuit board 240 of FIG. 2A) with the housing 510. For example, each of the connection members 520*a* and 520*b*** may be formed of a conductive material.

Referring to FIG. 5, the electronic device 500 may reduce the number of used connection members by integrating a connection member for fixing the housing 510 and a connection member for fixing the first circuit board 540 into the one connection member **520*b*. The second circuit boards 545*a* and 545*b* of the electronic device 500 may be located directly adjacent to the side surface of the housing 510. For example, the third antenna arrays 560*a* and 560*b* may be located almost directly adjacent to the side surface of the housing 510 or may be disposed close to the side surface of the housing 510**.

In various embodiments, each of the second circuit boards **545*a* and 545*b* may be referred to as an FPCB. The second circuit boards 545*a* and 545*b* may be close to a support member 530 (e.g., a support member 230 of FIG. 2A) which supports the display 520. When a form of the support member 520 shown in FIG. 5 is formed, a beam formed by the third antenna arrays 560*a* and 560*b*** may have directionality in the direction of front and side surfaces.

Figure 6A:
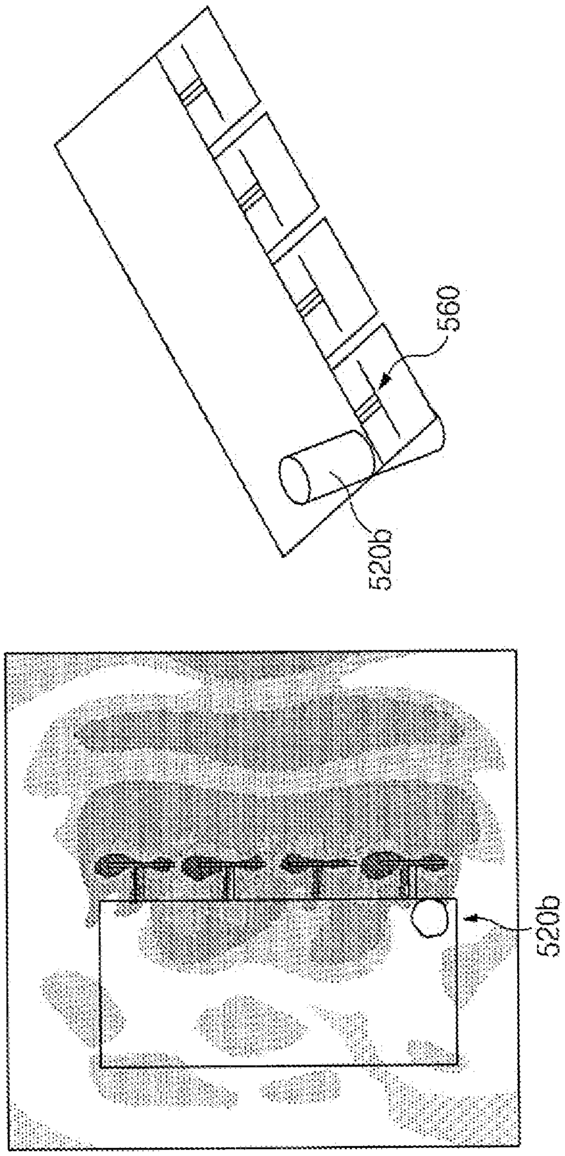
FIG. 6A and FIG. 6B are views illustrating performance of a plurality of antenna arrays according to arrangement of a circuit board shown in FIG. 5.
Figure 6B:
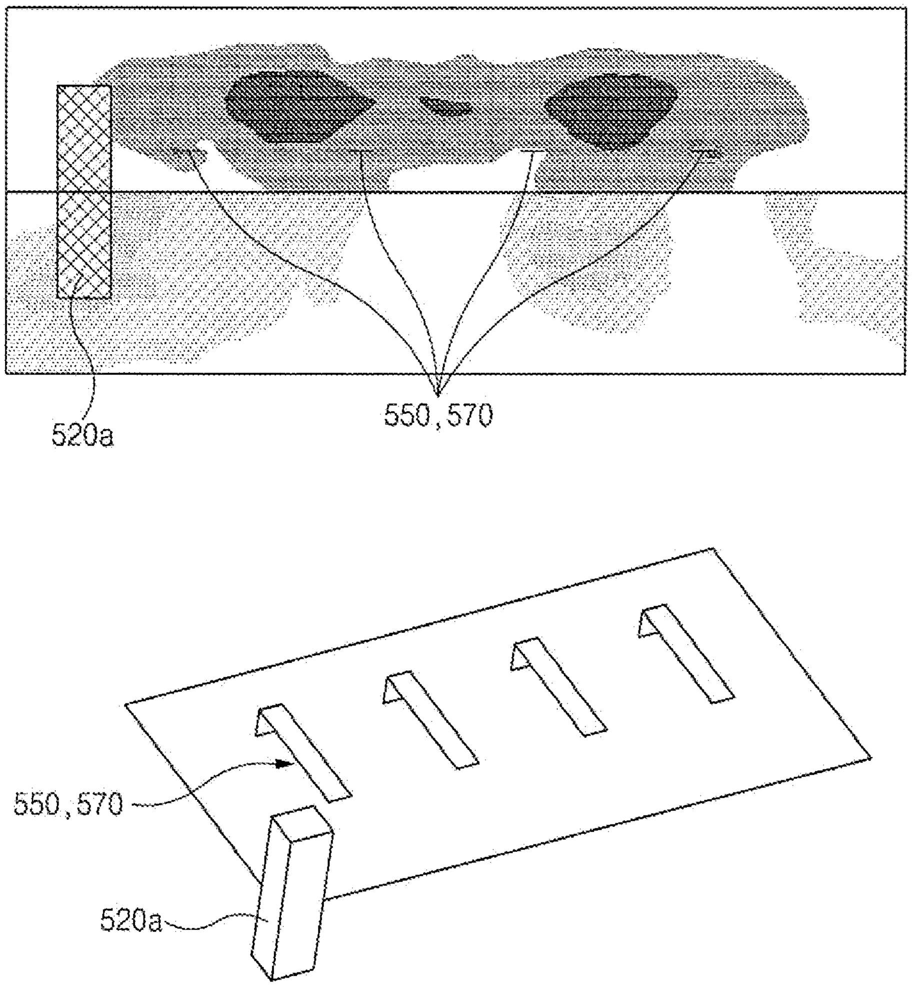

FIGS. 6A and 6B are views illustrating performance of a plurality of antenna arrays according to arrangement of a circuit board shown in FIG. 5.

According to various embodiments, a connection member **520*b* may be formed of a conductive material. The connection member 520*b* may be disposed close to antenna arrays included in an electronic device 500 of FIG. 5, having an influence on performance of the antenna arrays. Referring to FIGS. 6A and 6B, the result of measuring a radiation pattern of an antenna array is shown. An antenna radiation pattern is measured with respect to the electronic device 500 including the connection member 520*b* of FIG. 5**.

Referring to FIG. 6A, an antenna radiation pattern of third antenna elements **560*a* and 560*b* (in case of a dipole antenna). Connection members are integrated, so the connection member 520*b* and the third antenna elements 560*a* and 560*b* may be close to each other. However, the connection member 520***b* may have little influence on performance of the third antenna elements 560*a* and 560*b*.

Referring to FIG. 6B, an antenna pattern of a first antenna element 550 is shown. As connection members are integrated, a connection member 520*a* and the first antenna element 550 may be close to each other. However, the connection member 520*a* may have little influence on performance of the first antenna element 550.

Figure 7:
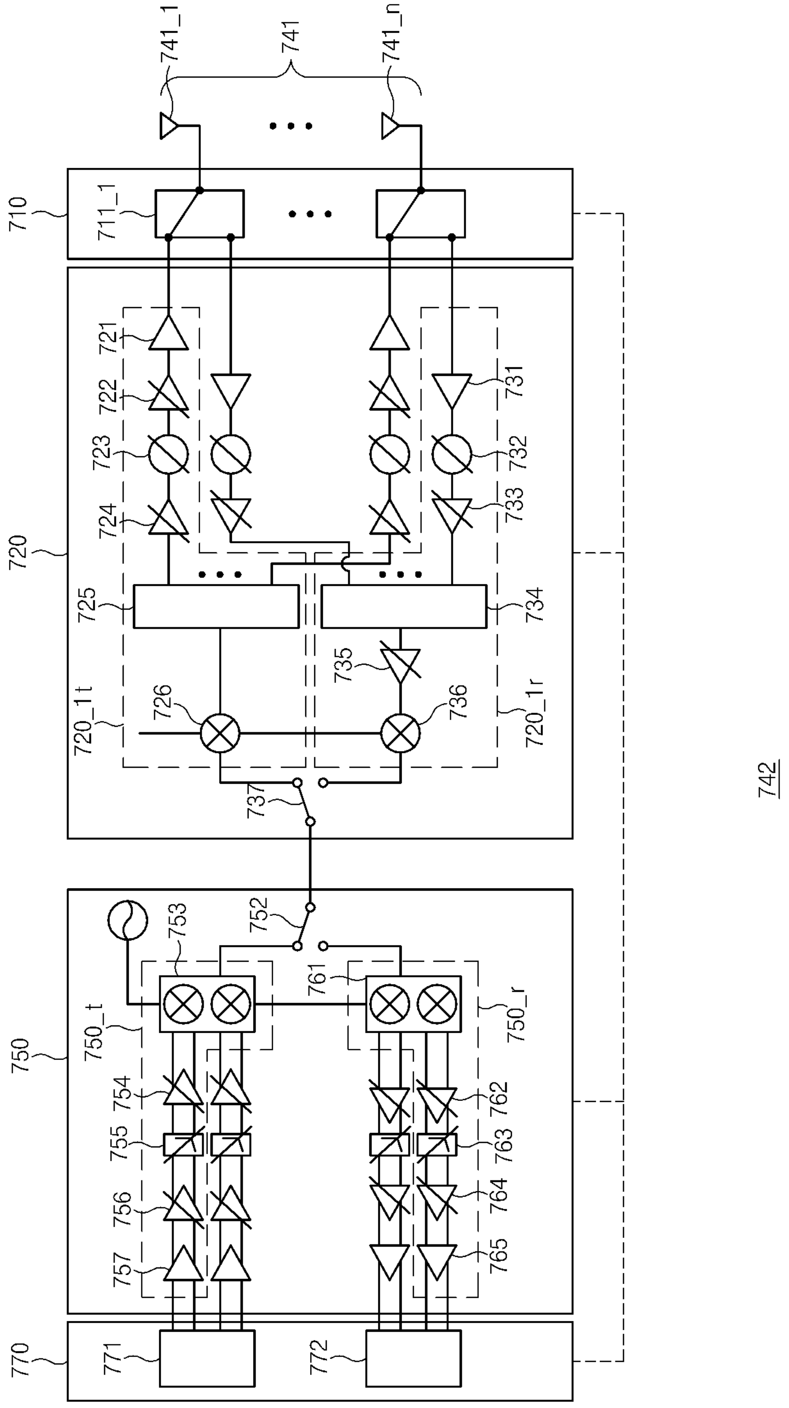
FIG. 7 is a circuit diagram illustrating a communication circuit for a plurality of antenna arrays according to various embodiments.

FIG. 7 is a circuit diagram illustrating a communication circuit for a plurality of antenna arrays according to various embodiments.

Referring to FIG. 7, a communication circuit 742 may include a switch group 710, an RFIC 720, an IFIC 750, and a communication processor 770. In various embodiments, some components may be added to the communication circuit 742, or some of the components of the communication circuit 742 may be omitted.

For example, the communication circuit 742 may operate as the RFIC 720 (e.g., a wireless communication circuit 142 of FIG. 1A) for first to third antennas (e.g., antenna arrays 150 and 170 of FIG. 1A or antenna arrays 250, 260, and 270 of FIG. 2C) and the IFIC 750 (e.g., an IFIC 104 of FIG. 1B). According to an embodiment, the communication circuit 742 may control the first to third antenna arrays or may transmit and receive a signal using the first to third antenna arrays.

According to an embodiment, antenna elements (e.g., antenna elements 711_1 to 741_*n*) included in an antenna array 741 may be connected with the RFIC 720 through a switch 711_1 included in the switch group 710. For example, when an electronic device (e.g., an electronic device 100 of FIG. 1A) transmits an RF signal (e.g., when the electronic device is in a signal transmission mode), the switch 711_1 may connect an antenna element (e.g., the antenna element 741_1) with a power amplifier (PA) (e.g., a PA 721). When the electronic device receives an RF signal (e.g., when the electronic device is in a signal reception mode), the switch 711_1 may connect the antenna element (e.g., the antenna element 741_1) with a low noise amplifier (LNA) (e.g., an LNA 731).

According to an embodiment, the RFIC 720 may include a transmit path 720_*lt* and a receive path 720_*lr* of an RF signal.

According to an embodiment, when the electronic device is in the signal transmission mode, the PA 721, a first variable gain amplifier (VGA) 722, a phase shifter (PS), a second VGA 724, a combiner 725, and a mixer 726 may be disposed on the transmit path 720_*lt* of the RF signal.

The PA 721 may amplify power of a transmitted RF signal. According to an embodiment, the PA 721 may be mounted on the inside or outside of the RFIC 720. The first VGA 722 and the second VGA 724 may perform an auto gain control (AGC) operation under control of the communication processor 770. According to an embodiment, the number of VGAs may be greater than or equal to 2 or may be less than 2. The PS 723 may change a phase of an RF signal depending on a beamforming angle under control of the communication processor 770. The combiner 725 may divide an RF signal received from the mixer 726 into n signals. The number of the divided signals may be the same as, for example, the number of the antenna elements (e.g., the antenna elements 741_1 to 741_*n*) included in the antenna array 741.

The mixer 726 may up-convert an IF signal received from the IFIC 750 into an RF signal. In an embodiment, the mixer 726 may receive a signal to be mixed from an internal or external oscillator. According to an embodiment, when the electronic device is in the signal reception mode, an LNA 731, a PS 732, a first VGA 733, a combiner 734, a second VGA 735, and a mixer 736 may be located on the receive path 720_*lr* of the RF signal.

The LNA 731 may amplify an RF signal received from antenna elements (e.g., the antenna elements 741_1 to 741_*n*). The first VGA 733 and the second VGA 735 may perform an AGC operation under control of the communication processor 770. According to an embodiment, the number of VGAs may be greater than or equal to 2 or may be less than 2. The PS 732 may change a phase of an RF signal depending on a beamforming angle under control of the communication processor 770. The combiner 734 may combine RF signals which align in phase after their phases are changed. The combined signal may be delivered to the mixer 736 via the second VGA 735. The mixer 736 may down-convert the received RF signal into an IF signal. In an embodiment, the mixer 736 may receive a signal to be mixed from an internal or external oscillator.

According to an embodiment, the RFIC 720 may further include a switch 737 for electrically connecting the mixer 726 or 736 with the IFIC 750. The switch 737 may selectively connect the transmit path (720_*lt*) or the receive path (720_*lr*) of the RF signal with the IFIC 750.

According to an embodiment, the IFIC 750 may include a transmit path 750_*t*, a receive path 750_*r*, and a switch 752 for selectively connecting the transmit path 750_*t* or the receive path 750_*r* with the RFIC 720.

According to an embodiment, a mixer 753, a third VGA 754, a low pass filter (LPF) 755, a fourth VGA 756, and a buffer 757 may be disposed on the transmit path 750_*t* in the IFIC 750. The mixer 753 may convert a balanced in-phase/quadrature-phase (I/Q) signal of a baseband into an IF signal. The LPF 755 may play a role as a channel filter which uses a bandwidth of a baseband signal as a cutoff frequency. In an embodiment, the cutoff frequency may be variable. The third VGA 754 and the fourth VGA 756 may perform a transmission AGC operation under control of the communication processor 770. According to an embodiment, the number of VGAs may be greater than or equal to 2 or may be less than 2. The buffer 757 may play a role in buffering when receiving a balanced I/Q signal from the communication processor 770. As a result, the IFIC 750 may stably process the balanced I/Q signal.

According to an embodiment, a mixer 761, a third VGA 762, an LPF 763, a fourth VGA 764, and a buffer 765 may be disposed on the receive path 750_*r* in the IFIC 750. The roles of the third VGA 762, the LPF 763, and the fourth VGA 764 may be the same or similar to those of the third VGA 754, the LPF 755, and the fourth VGA 756, disposed on the transmit path 750_*t*, respectively. The mixer 761 may convert an IF signal transmitted from the RFIC 720 into a balanced I/Q signal of a baseband. The buffer 765 may play a role in buffering when delivering a balanced I/Q signal of a baseband passing through the fourth VGA 764 to the communication processor 770. As a result, the IFIC 750 may stably process the balanced I/Q signal.

According to an embodiment, the communication processor 770 may include a Tx I/Q digital analog converter (DAC) 771 and an Rx I/Q analog digital converter (ADC) 772. In an embodiment, the Tx I/Q DAC 771 may convert a digital signal modulated by a modem into a balanced I/Q signal and may deliver the balanced I/Q signal to the IFIC 750. In an embodiment, the Rx I/Q ADC 772 may convert a balanced I/Q signal converted by the IFIC 750 into a digital signal and may deliver the digital signal to the modem.

According to various embodiments, the communication processor 770 may perform multi input multi output (MIMO).

According to various embodiments, the communication processor 770 may be implemented as a separate chip, or the communication processor 770 and another component (e.g., the IFIC 750) may be implemented as one chip. According to various embodiments, the communication circuit 742 may further include an RFIC and an IFIC.

An electronic device (e.g., an electronic device 100 of FIG. 1A) according to various embodiments may include a housing (e.g., a housing 110 of FIG. 1A) comprising a front plate (e.g., a front plate 112 of FIG. 1A) facing a first direction, a back plate (e.g., a back plate 114 of FIG. 1A) facing a second direction opposite to the first direction, and a side surface (e.g., a side surface 116 of FIG. 1A) which surrounds the front plate and the back plate, the front plate including a screen area (e.g., a screen area 112*a* of FIG. 1A) and a bezel area (e.g., a bezel area 112*b* of FIG. 1A), a display (e.g., a display 120 of FIG. 1A) exposed through the screen area of the front plate, a first circuit board (e.g., a first circuit board 140 of FIG. 1A) disposed between the display and the back plate and include a first surface (e.g., a first surface 140*a* of FIG. 1A) facing the display and a second surface (e.g., a second surface 140*b* of FIG. 1A) facing the back plate, a first antenna array (e.g., a first antenna array 150 of FIG. 1A) disposed on the bezel area in the first surface, a second antenna array (e.g., a second antenna array 170 of FIG. 1A) disposed on the second surface, and a wireless communication circuit (e.g., a wireless communication circuit 142 of FIG. 1A) disposed on the first circuit board and electrically connected with the first antenna array and the second antenna array. The wireless communication circuit may be configured to form a beam which has directionality in the first direction using the first antenna array and form a beam which has directionality in the second direction using the second antenna array.

The electronic device according to various embodiments may further include a conductive support member (e.g., a support member 230 of FIG. 2B) configured to support the display and include at least one through-hole (e.g., a through-hole 232 of FIG. 2B) formed between the bezel area and the first antenna array. The through-hole may be formed through the conductive support member in the first direction.

The wireless communication circuit according to various embodiments may included a conductive path through the through-hole carrying a signal transmitted or received using the first antenna array. The first antenna array may include a plurality of antenna elements isolated by the through-hole.

The wireless communication circuit according to various embodiments may be configured to transmit and receive a signal of a frequency band corresponding to a size of the at least one through-hole using the first antenna array.

The wireless communication circuit according to various embodiments may be configured to transmit and receive a signal of a frequency band of 20 GHz or higher using the first antenna array and the second antenna array.

The electronic device according to various embodiments may further include a dielectric (e.g., a dielectric 460 of FIG. 4) disposed between the bezel area and the first antenna array, formed of a non-conductive material, and supporting the first circuit board.

The wireless communication circuit according to various embodiments may be configured to allow a signal transmitted or received using the first antenna to pass through the dielectric.

The electronic device according to various embodiments may further include a second circuit board (e.g., second circuit boards 545*a* and 545*b* of FIG. 5) disposed adjacent to the side surface between the display and the back plate and combined with the first circuit board and a third antenna array (e.g., a third antenna array 260 of FIG. 2C) disposed on the second circuit board and electrically connected with the wireless communication circuit. The wireless communication circuit may be configured to form a beam which has directionality in a third direction orthogonal to the first direction and the second direction, using the third antenna array.

The electronic device according to various embodiments may further include a conductive plate (e.g., a conductive plate 246 of FIG. 2D) disposed between the first antenna array and the third antenna array.

The electronic device according to various embodiments may further include a conductive connection member configured to fix the first circuit board, the front plate, and the back plate. The third antenna array may be disposed close to the side surface.

Each of the first antenna array and the second antenna array according to various embodiments may include a plurality of patch antennas. The third antenna array may include a plurality of dipole antennas.

An electronic device (e.g., an electronic device of FIG. 1A) may include a housing (e.g., a housing 110 of FIG. 1A) including a front plate (e.g., a front plate 112 of FIG. 1A), a back plate (e.g., a back plate 114 of FIG. 1A) facing a direction opposite to the front plate, and a side member (e.g., a side surface 116 of FIG. 1A) which surrounds a space between the front plate and the back plate and be integrated with the back plate or be attached to the back plate, a touch screen display configured to be located in the housing and be exposed through a first portion (e.g., a screen area 112*a* of FIG. 1A) of the front plate, an antenna array (e.g., a first antenna array 150 of FIG. 1A) located in the housing when viewed from above the front plate and include a plurality of isolated antenna elements disposed in a gap between the touch screen display and the side member, and a wireless communication circuit (e.g., a wireless communication circuit 142 of FIG. 1A) located in the housing and be electrically connected with the antenna array. The wireless communication circuit may form a beam using the antenna array.

The wireless communication circuit according to various embodiments may generate a signal having a frequency between 25 GHz and 32 GHz.

The antenna elements according to various embodiments may be aligned around the touch screen display when viewed from above the front plate.

The electronic device according to various embodiments may further include a second antenna array (e.g., a second antenna array 170 of FIG. 1A) located between the touch screen display and the back plate. The wireless communication circuit may be electrically connected with the second antenna array.

The electronic device according to various embodiments may further include an opaque layer between the front plate and the antenna array.

The opaque layer according to various embodiments may include a black mask layer.

The electronic device according to various embodiments may further include a conductive internal structure (e.g., a support member 230 of FIG. 2B) configured to support the touch screen display. The conductive internal structure may include a portion which extends into the gap between the antenna array and the front plate. The portion may include a plurality of through-holes (e.g., a through-hole 232 of FIG. 2B) through which a signal emitted from the antenna elements passes.

The plurality of through-holes according to various embodiments may have shapes and sizes corresponding to the antenna elements.

The internal structure according to various embodiments may further include an insulating material which at least partially fills the plurality of through-holes.

Figure 8:
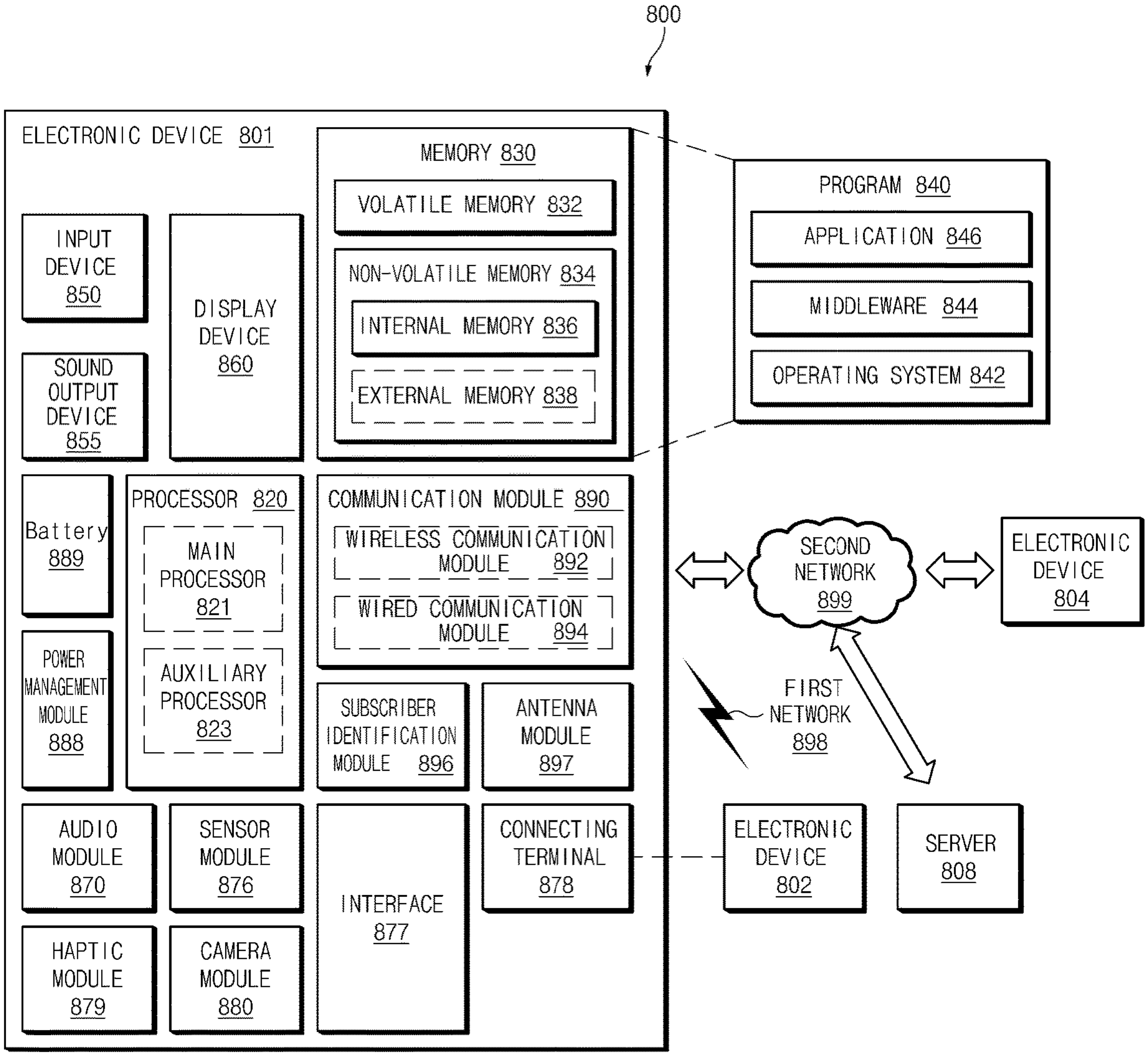
FIG. 8 is a block diagram illustrating a configuration of an electronic device in a network environment according to various embodiments.

FIG. 8 is a block diagram illustrating an electronic device 801 in a network environment 800 according to various embodiments. Referring to FIG. 8, the electronic device 801 (e.g. the electronic device 100 in FIG. 1 or the electronic device 200 in FIG. 2) in the network environment 800 may communicate with an electronic device 802 via a first network 898 (e.g., a short-range wireless communication network), or an electronic device 804 or a server 808 via a second network 899 (e.g., a long-range wireless communication network). According to an embodiment, the electronic device 801 may communicate with the electronic device 804 via the server 808. According to an embodiment, the electronic device 801 may include a processor 820, memory 830, an input device 850, a sound output device 855, a display device 860, an audio module 870, a sensor module 876, an interface 877, a haptic module 879, a camera module 880, a power management module 888, a battery 889, a communication module 890, a subscriber identification module (SIM) 896, or an antenna module 897. In some embodiments, at least one (e.g., the display device 860 or the camera module 880) of the components may be omitted from the electronic device 801, or one or more other components may be added in the electronic device 801. In some embodiments, some of the components may be implemented as single integrated circuitry. For example, the sensor module 876 (e.g., a fingerprint sensor, an iris sensor, or an illuminance sensor) may be implemented as embedded in the display device 860 (e.g., a display).

The processor 820 may execute, for example, software (e.g., a program 840) to control at least one other component (e.g., a hardware or software component) of the electronic device 801 coupled with the processor 820, and may perform various data processing or computation. According to one embodiment, as at least part of the data processing or computation, the processor 820 may load a command or data received from another component (e.g., the sensor module 876 or the communication module 890) in volatile memory 832, process the command or the data stored in the volatile memory 832, and store resulting data in non-volatile memory 834. According to an embodiment, the processor 820 may include a main processor 821 (e.g., a central processing unit (CPU) or an application processor (AP)), and an auxiliary processor 823 (e.g., a graphics processing unit (GPU), an image signal processor (ISP), a sensor hub processor, or a communication processor (CP)) that is operable independently from, or in conjunction with, the main processor 821. Additionally or alternatively, the auxiliary processor 823 may be adapted to consume less power than the main processor 821, or to be specific to a specified function. The auxiliary processor 823 may be implemented as separate from, or as part of the main processor 821.

The auxiliary processor 823 may control at least some of functions or states related to at least one component (e.g., the display device 860, the sensor module 876, or the communication module 890) among the components of the electronic device 801, instead of the main processor 821 while the main processor 821 is in an inactive (e.g., sleep) state, or together with the main processor 821 while the main processor 821 is in an active state (e.g., executing an application). According to an embodiment, the auxiliary processor 823 (e.g., an image signal processor or a communication processor) may be implemented as part of another component (e.g., the camera module 880 or the communication module 890) functionally related to the auxiliary processor 823.

The memory 830 may store various data used by at least one component (e.g., the processor 820 or the sensor module 876) of the electronic device 801. The various data may include, for example, software (e.g., the program 840) and input data or output data for a command related thereto. The memory 830 may include the volatile memory 832 or the non-volatile memory 834.

The program 840 may be stored in the memory 830 as software, and may include, for example, an operating system (OS) 842, middleware 844, or an application 846.

The input device 850 may receive a command or data to be used by other component (e.g., the processor 820) of the electronic device 801, from the outside (e.g., a user) of the electronic device 801. The input device 850 may include, for example, a microphone, a mouse, a keyboard, or a digital pen (e.g., a stylus pen).

The sound output device 855 may output sound signals to the outside of the electronic device 801. The sound output device 855 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 860 may visually provide information to the outside (e.g., a user) of the electronic device 801. The display device 860 may include, for example, a display, a hologram device, or a projector and control circuitry to control a corresponding one of the display, hologram device, and projector. According to an embodiment, the display device 860 may include touch circuitry adapted to detect a touch, or sensor circuitry (e.g., a pressure sensor) adapted to measure the intensity of force incurred by the touch.

The audio module 870 may convert a sound into an electrical signal and vice versa. According to an embodiment, the audio module 870 may obtain the sound via the input device 850, or output the sound via the sound output device 855 or a headphone of an external electronic device (e.g., an electronic device 802) directly (e.g., wiredly) or wirelessly coupled with the electronic device 801.

The sensor module 876 may detect an operational state (e.g., power or temperature) of the electronic device 801 or an environmental state (e.g., a state of a user) external to the electronic device 801, and then generate an electrical signal or data value corresponding to the detected state. According to an embodiment, the sensor module 876 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 877 may support one or more specified protocols to be used for the electronic device 801 to be coupled with the external electronic device (e.g., the electronic device 802) directly (e.g., wiredly) or wirelessly. According to an embodiment, the interface 877 may include, for example, a high definition multimedia interface (HDMI), a universal serial bus (USB) interface, a secure digital (SD) card interface, or an audio interface.

A connecting terminal 878 may include a connector via which the electronic device 801 may be physically connected with the external electronic device (e.g., the electronic device 802). According to an embodiment, the connecting terminal 878 may include, for example, a HDMI connector, a USB connector, a SD card connector, or an audio connector (e.g., a headphone connector).

The haptic module 879 may convert an electrical signal into a mechanical stimulus (e.g., a vibration or a movement) or electrical stimulus which may be recognized by a user via his tactile sensation or kinesthetic sensation. According to an embodiment, the haptic module 879 may include, for example, a motor, a piezoelectric element, or an electric stimulator.

The camera module 880 may capture a still image or moving images. According to an embodiment, the camera module 880 may include one or more lenses, image sensors, image signal processors, or flashes.

The power management module 888 may manage power supplied to the electronic device 801. According to one embodiment, the power management module 888 may be implemented as at least part of, for example, a power management integrated circuit (PMIC).

The battery 889 may supply power to at least one component of the electronic device 801. According to an embodiment, the battery 889 may include, for example, a primary cell which is not rechargeable, a secondary cell which is rechargeable, or a fuel cell.

The communication module 890 may support establishing a direct (e.g., wired) communication channel or a wireless communication channel between the electronic device 801 and the external electronic device (e.g., the electronic device 802, the electronic device 804, or the server 808) and performing communication via the established communication channel. The communication module 890 may include one or more communication processors (e.g. the communication processor 770 of the wireless communication circuit 742 in FIG. 7) that are operable independently from the processor 820 (e.g., the application processor (AP)) and supports a direct (e.g., wired) communication or a wireless communication. According to an embodiment, the communication module 890 may include a wireless communication module 892 (e.g., a cellular communication module, a short-range wireless communication module, or a global navigation satellite system (GNSS) communication module) or a wired communication module 894 (e.g., a local area network (LAN) communication module or a power line communication (PLC) module). A corresponding one of these communication modules may communicate with the external electronic device via the first network 898 (e.g., a short-range communication network, such as Bluetooth, wireless-fidelity (Wi-Fi) direct, or infrared data association (IrDA)) or the second network 899 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 892 may identify and authenticate the electronic device 801 in a communication network, such as the first network 898 or the second network 899, using subscriber information (e.g., international mobile subscriber identity (IMSI)) stored in the subscriber identification module 896.

The antenna module 897 may transmit or receive a signal or power to or from the outside (e.g., the external electronic device) of the electronic device 801. According to an embodiment, the antenna module 897 may include an antenna including a radiating element composed of a conductive material or a conductive pattern formed in or on a substrate (e.g., PCB). According to an embodiment, the antenna module 897 may include a plurality of antennas. In such a case, at least one antenna appropriate for a communication scheme used in the communication network, such as the first network 898 or the second network 899, may be selected, for example, by the communication module 890 (e.g., the wireless communication module 892) from the plurality of antennas. The signal or the power may then be transmitted or received between the communication module 890 and the external electronic device via the selected at least one antenna. According to an embodiment, another component (e.g., a radio frequency integrated circuit (RFIC)) other than the radiating element may be additionally formed as part of the antenna module 897.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 801 and the external electronic device 804 via the server 808 coupled with the second network 899. Each of the electronic devices 802 and 804 may be a device of a same type as, or a different type, from the electronic device 801. According to an embodiment, all or some of operations to be executed at the electronic device 801 may be executed at one or more of the external electronic devices 802, 804, or 808. For example, if the electronic device 801 should perform a function or a service automatically, or in response to a request from a user or another device, the electronic device 801, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 801. The electronic device 801 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 840) including one or more instructions that are stored in a storage medium (e.g., internal memory 836 or external memory 838) that is readable by a machine (e.g., the electronic device 801). For example, a processor (e.g., the processor 820) of the machine (e.g., the electronic device 801) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A portable communication device, comprising:

a housing including a conductive member and a glass layer, the glass layer forming a portion of an outer surface of the portable communication device, the housing including at least one opening formed in a portion of the conductive member;

a first antenna array accommodated in the housing and facing in a first direction, the first antenna array including at least one antenna element facing the at least one opening; and a second antenna array accommodated in the housing and facing in a second direction, wherein the at least one opening is located between the glass layer and the first antenna array, wherein a non-conductive member is disposed on the at least one antenna element and between the glass layer and the first antenna array, and wherein an opaque layer is located at least between the non-conductive member and the glass layer.

2. The portable communication device of claim 1, further comprising a display accommodated in the housing, wherein the housing including:

a display area, when viewed from above a front surface of the portable communication device, overlapped with the display, and a non-display area, when viewed from above the front surface, not overlapped with the display.

3. The portable communication device of claim 2, wherein the at least one opening comprises a first opening and a second opening located in the non-display area, and wherein the at least one antenna element comprises a first antenna element facing the first opening and a second antenna element facing the second opening.

4. The portable communication device of claim 3, wherein shapes of the first opening and the second opening correspond to the first antenna element and the second antenna element.

5. The portable communication device of claim 3, wherein at least a part of the non-conductive member is filled in the first and second openings.

6. The portable communication device of claim 1, wherein the opaque layer is located on a surface of the glass layer.

7. The portable communication device of claim 1, wherein the second antenna array includes a first set of four antenna elements arranged in a first row, and a second set of four antenna elements arranged in a second row.

8. The portable communication device of claim 1, further comprising a third antenna array accommodated in the housing and facing in a third direction substantially perpendicular to the first direction.

9. The portable communication device of claim 1, further comprising a wireless communication circuit configured to transmit and receive signals of a frequency band of 20 GHz or higher using the first antenna array.

10. The portable communication device of claim 9, wherein the wireless communication circuit is further configured to allow a signal transmitted or received using the first antenna array to pass through the non-conductive member.

11. The portable communication device of claim 9, wherein the wireless communication circuit is further configured to control the first antenna array to radiate a beam in the first direction.

12. The portable communication device of claim 9, further comprising a first circuit board, wherein the at least one antenna element is disposed at a first surface of the first circuit board, and wherein the wireless communication circuit is disposed at a second surface of the first circuit board.

13. The portable communication device of claim 1, wherein the first antenna array is disposed close to a side surface of the portable communication device.

14. The portable communication device of claim 1, wherein each of the first antenna array and the second antenna array comprises a plurality of patch antennas.

15. A portable communication device, comprising:

a housing including a conductive member and a glass layer, the glass layer forming a portion of an outer surface of the portable communication device, the housing including at least one opening formed in a portion of the conductive member;

a first antenna array accommodated in the housing and facing in a first direction, the first antenna array including at least one antenna element facing the at least one opening; and a second antenna array accommodated in the housing and facing in a second direction, wherein the at least one opening is located between the glass layer and the first antenna array, wherein a non-conductive member is disposed on the at least one antenna element and between the glass layer and the first antenna array, and wherein an opaque layer is located at least between the first antenna array and the glass layer.

16. The portable communication device of claim 15, further comprising a display accommodated in the housing, wherein the housing including:

a display area, when viewed from above a front surface of the portable communication device, overlapped with the display, and a non-display area, when viewed from above the front surface, not overlapped with the display.

17. The portable communication device of claim 16, wherein the at least one opening comprises a first opening and a second opening located in the non-display area, and wherein the at least one antenna element comprises a first antenna element facing the first opening and a second antenna element facing the second opening.

18. The portable communication device of claim 17, wherein shapes of the first opening and the second opening correspond to the first antenna element and the second antenna element.

19. The portable communication device of claim 17, wherein at least a part of the non-conductive member is filled in the first and second openings.

20. The portable communication device of claim 15, wherein the opaque layer is located on a surface of the glass layer.

21. The portable communication device of claim 15, wherein the second antenna array includes a first set of four antenna elements arranged in a first row, and a second set of four antenna elements arranged in a second row.

22. The portable communication device of claim 15, further comprising a third antenna array accommodated in the housing and facing in a third direction substantially perpendicular to the first direction.

23. The portable communication device of claim 15, further comprising a wireless communication circuit configured to transmit and receive signals of a frequency band of 20 GHz or higher using the first antenna array.

24. The portable communication device of claim 23, wherein the wireless communication circuit is further configured to allow a signal transmitted or received using the first antenna array to pass through the non-conductive member.

25. The portable communication device of claim 23, wherein the wireless communication circuit is further configured to control the first antenna array to radiate a beam in the first direction.

26. The portable communication device of claim 23, further comprising a first circuit board, wherein the at least one antenna element is disposed at a first surface of the first circuit board, and wherein the wireless communication circuit is disposed at a second surface of the first circuit board.

27. The portable communication device of claim 15, wherein the first antenna array is disposed close to a side surface of the portable communication device.

28. The portable communication device of claim 15, wherein each of the first antenna array and the second antenna array comprises a plurality of patch antennas.

* * * * *